United States Patent
Liu et al.

(10) Patent No.: US 7,325,149 B2
(45) Date of Patent: Jan. 29, 2008

(54) POWER-ON MANAGEMENT FOR REMOTE POWER-ON SIGNALS TO HIGH DENSITY SERVER MODULE

(75) Inventors: Wei Liu, Austin, TX (US); Hamid Javanpour, Austin, TX (US); Ryan W. Putman, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 498 days.

(21) Appl. No.: 11/014,660

(22) Filed: Dec. 16, 2004

(65) Prior Publication Data

US 2006/0136754 A1    Jun. 22, 2006

(51) Int. Cl.
    G06F 1/26    (2006.01)
(52) U.S. Cl. .............. 713/300; 713/310; 713/323; 709/227
(58) Field of Classification Search .......... 713/300
See application file for complete search history.

(56) References Cited

U.S. PATENT DOCUMENTS

| | | | |
|---|---|---|---|
| 5,938,771 A * | 8/1999 | Williams et al. ........... 713/310 |
| 6,453,423 B1 * | 9/2002 | Loison ....................... 713/310 |
| 6,591,368 B1 * | 7/2003 | Ryu .......................... 713/323 |
| 6,701,442 B1 | 3/2004 | Kunz et al. ................. 713/300 |
| 6,799,278 B2 * | 9/2004 | Khatri et al. ............... 713/300 |
| 6,976,112 B2 * | 12/2005 | Franke et al. .............. 710/302 |
| 7,043,647 B2 * | 5/2006 | Hansen et al. ............. 713/320 |
| 7,103,785 B2 * | 9/2006 | Green et al. ............... 713/310 |
| 7,134,007 B2 * | 11/2006 | Zimmer et al. ............. 713/1 |
| 7,137,014 B2 * | 11/2006 | Dake et al. ................. 713/300 |
| 7,139,861 B2 * | 11/2006 | Lee ........................... 710/316 |
| 2002/0194512 A1 | 12/2002 | Weng et al. ................ 713/300 |
| 2003/0126486 A1 | 7/2003 | Bui ........................... 713/320 |
| 2004/0103329 A1 | 5/2004 | Morisawa .................. 713/300 |
| 2004/0117671 A1 * | 6/2004 | Kurts et al. ................ 713/300 |
| 2004/0207440 A1 | 10/2004 | Robertson et al. .......... 327/291 |
| 2005/0283561 A1 * | 12/2005 | Lee et al. ................... 710/307 |
| 2006/0136703 A1 * | 6/2006 | Wisecup et al. ............ 713/2 |

* cited by examiner

Primary Examiner—Nitin C. Patel
(74) Attorney, Agent, or Firm—Baker Botts L.L.P.

(57) ABSTRACT

A method and apparatus for managing power in a server system having clustered server modules. A remote power-on signal delivered to a particular server module is routed to a baseboard management controller (BMC) of the server module. The BMC communicates with a central power management controller (MC) of the server system to ensure that the system currently has sufficient power to power-on the server module.

22 Claims, 3 Drawing Sheets

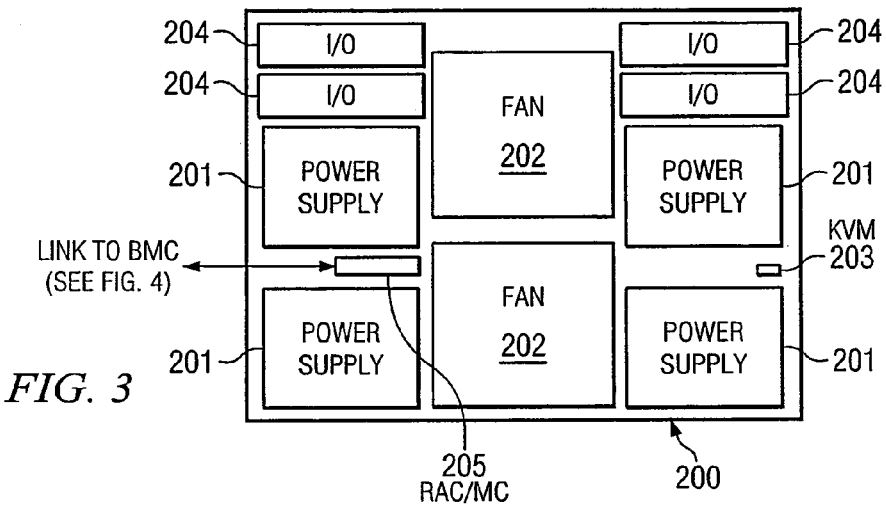
FIG. 3
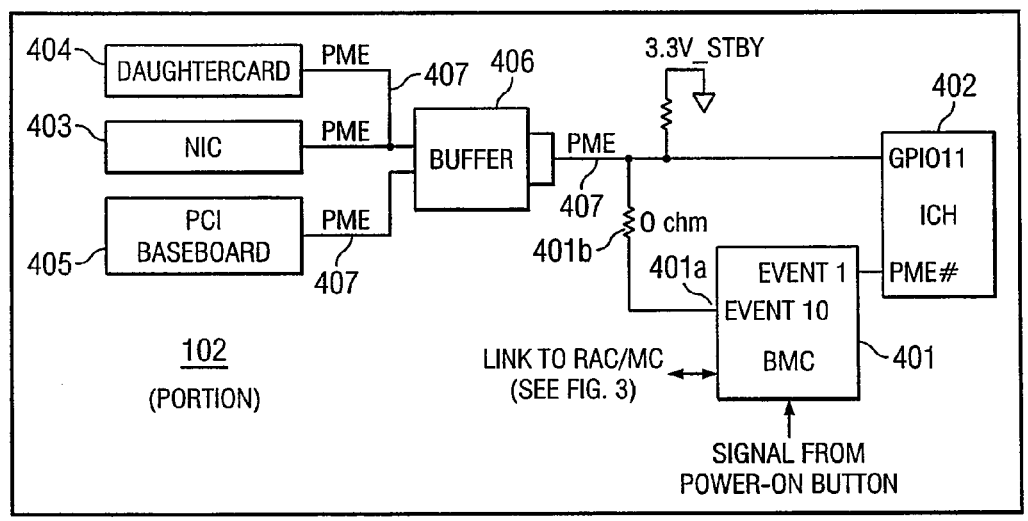
FIG. 4
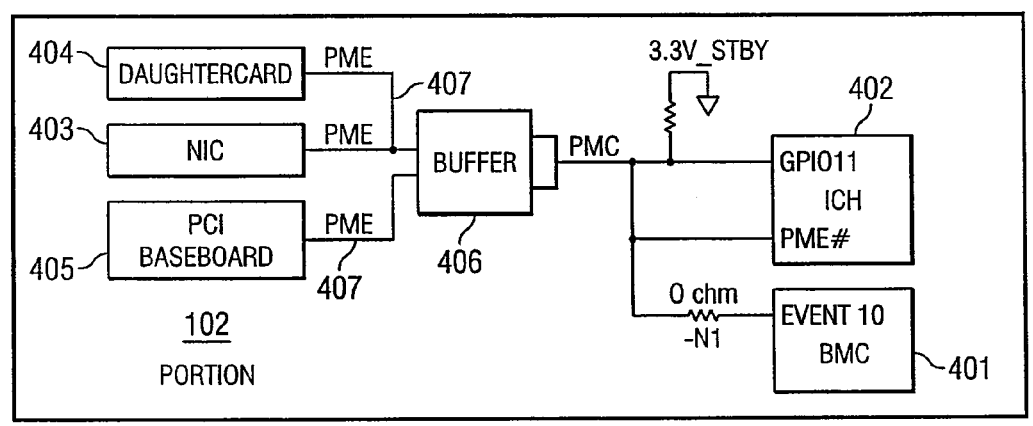
(PRIOR ART) FIG. 5

POWER-ON MANAGEMENT FOR REMOTE POWER-ON SIGNALS TO HIGH DENSITY SERVER MODULE

TECHNICAL FIELD

This invention relates to information handling systems, and more specifically to power management by a high density server module in response to power-on signals from a remote source.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling device is a server, which is a processor-based device on a network that manages network resources. As examples, a file server is dedicated to storing files, a print server manages one or more printers, a network server manages network traffic, and a database server processes database queries. A Web server services Internet World Wide Web pages.

In recent years, servers have been produced as "blade servers", which are thin, modular electronic circuit boards, containing one or more microprocessors, memory, and other server hardware and firmware. Blade servers can be easily inserted into a space-saving rack with many other blade servers.

Blade servers are sometimes referred to as a high-density servers. They are often used in clusters of servers dedicated to a single task.

In a clustered server system, there is a potential for a large inrush power load, if multiple server modules are simultaneously powered on. One cure for this problem is to overbuild the power supply to satisfy such inrush loads. Another approach is to use various power management and budgeting techniques.

SUMMARY

In accordance with teachings of the present disclosure, a system and method are described for managing a power-on signal received by a server module from a remote source. It is assumed that the server module is part of a clustered server system having a central power management controller (MC). An example of such a server is a blade server, such as those manufactured by Dell Corporation.

The power-on signal is received by a network interface controller (NIC) of the server module. The power-on signal is routed to a baseboard management controller (BMC) of the server module. The BMC is programmed to request permission from the MC to accomplish the power-on.

If the MC delivers a signal to the BMC representing permission to power-on, the BMC forwards the power-on signal an I/O control hub (ICH), which then powers-on the server module. If the MC does not permit the power-on, the BMC does not forward the power-on signal to the ICH.

A typical application of the invention is in response to a WOL (wake on LAN) signal from a remote computing device. The method prevents such a signal from resulting in a power-on of the blade server without prior power budget checking by the MC.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a block diagram of the rear modules of FIG. 2.

FIG. 4 illustrates internal components of a server blade relevant to the invention, configured for power management in accordance with the invention.

FIG. 5 illustrates the internal components of FIG. 4, but without power management in accordance with the invention.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As indicated in the Background, one type of information handling system is a server system. In general terms, a server system communicates with one or more client systems for the purposes of exchanging information and performing transactions.

Figure 1:
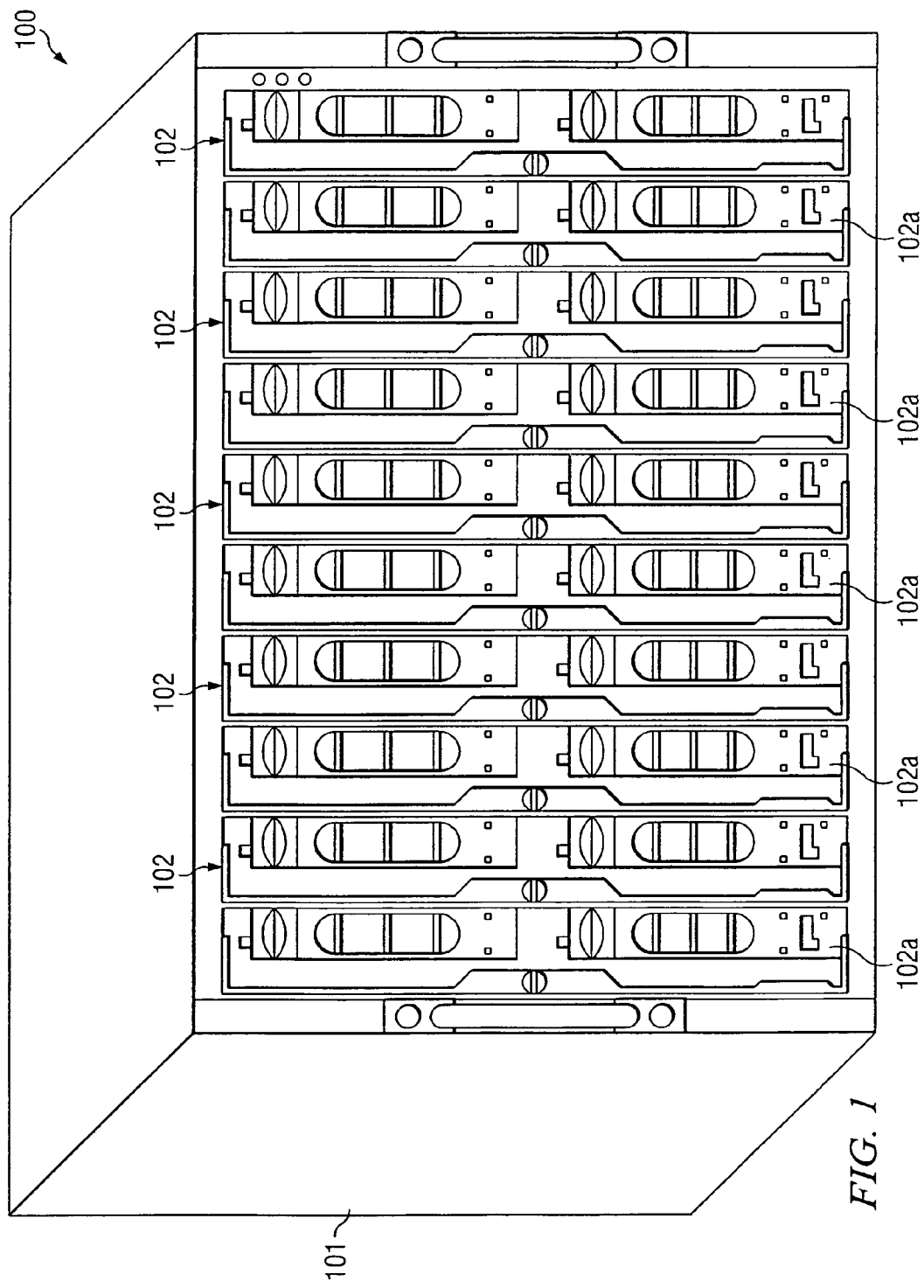
FIG. 1 is a front perspective view of a server system.

FIG. 1 is a front perspective view of a server system 100 enclosed within chassis 101. Chassis 101 accepts one or more server modules 102.

In the example of this description, server system 100 is a "blade" server system, and each server module 102 is a server blade. As described in the Background, a server blade is a thin modular electronic circuit board containing one or more processors, memory, and other hardware and firmware.

A blade server is typically "hot pluggable", meaning that it can be installed or removed while the rest of the server system 100 is running. A power-on button 210a permits each blade to be independently powered on or off.

In the example of FIG. 1, server system 100 accommodates ten server modules (blades) 102. In other embodiments there may be more or fewer server modules, and the modules need not be "blade" type modules. For example, the server modules 102 may be a type of server module referred to as a "brick" server module.

Figure 2:
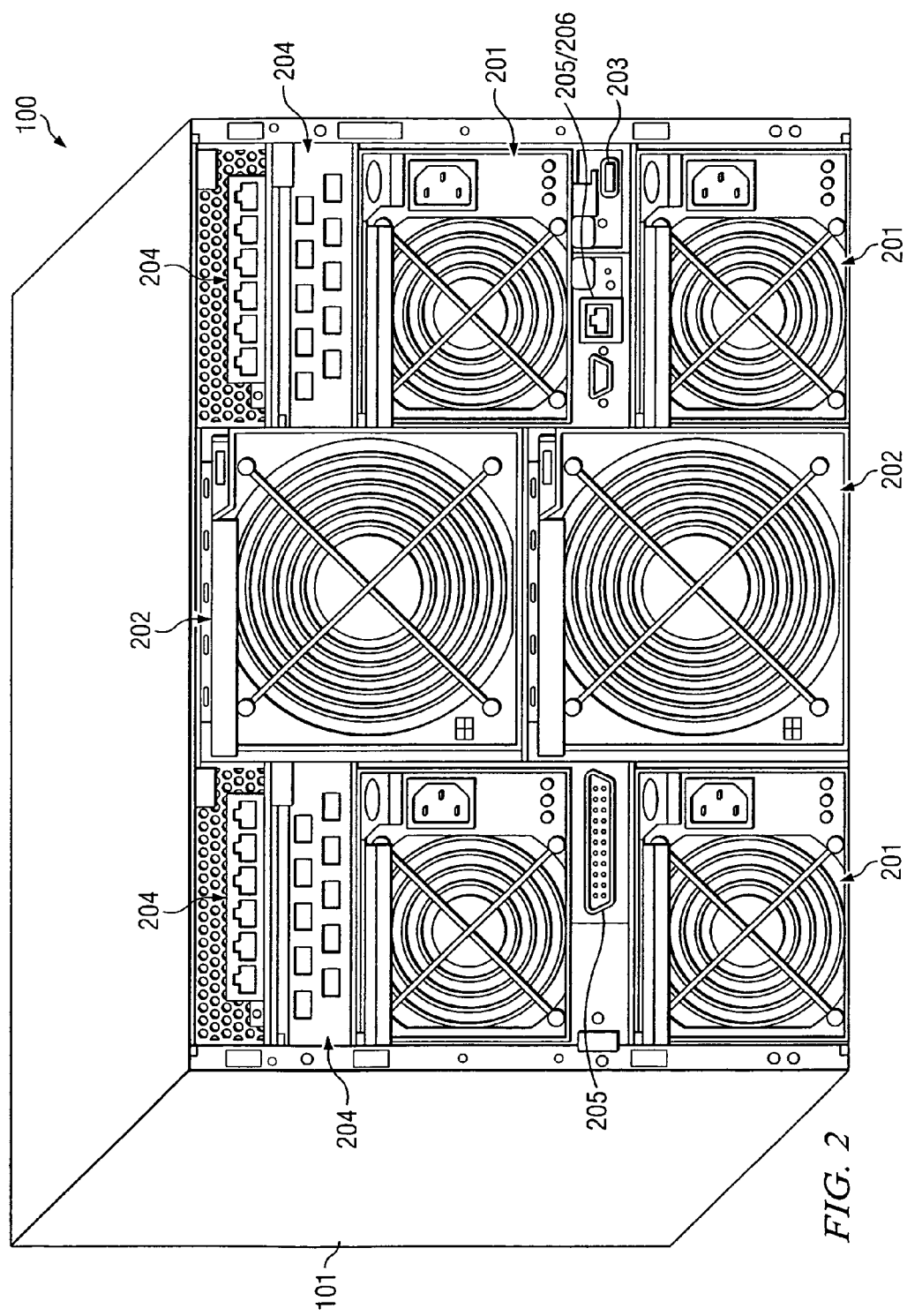
FIG. 2 is a rear perspective view of the server system of FIG. 1, showing various rear modules associated with the chassis.

FIG. 2 is a back perspective view of server system 100, and various rear modules 201-205 associated with the chassis 101. FIG. 3 is a schematic view of the same rear modules.

Referring to both FIGS. 2 and 3, the rear modules include redundant power supplies 201, redundant cooling fans 202, and a keyboard, video, and mouse (KVM) switch 203. Four I/O modules 204 provide various I/O communication and network capabilities, such as for Ethernet or fibre channel connections.

A RAC/MC (Remote Access Control/Management Control) module 205 provides management of the chassis 101 and blade servers 102. Its tasks include power control, event log reporting, and inventory reporting. RAC/MC module 205 has remote access hardware for remote management.

Chassis 101 has appropriate ports, such as Ethernet and fibre channel ports associated with the I/O modules 204. The KVM module 203 supports video and PS/2 connections. The RAC/MC module 205 has serial and Ethernet connections.

Server system 100 communicates with remote information handling devices using a communication protocol over a network. The communication network may be an Ethernet network, Fast Ethernet or other type of local or wide area network (LAN or WAN), a point-to-point network provided by telephone services, or other type of communication network or combination of networks.

As explained below, the invention described herein is directed to the receipt, from a remote information handling device or other source, of a "remote power-on" signal to a particular server blade 102. It is assumed that the server blade 102 is part of a server system 100, which has a central power management device such as RAC/MC module 205. Power management programming of both the RAC/MC module 205 and the blade server 102 cooperate to ensure that power supply(ies) 201 can provide sufficient power to achieve the power-on without adverse effect to system 100.

Specifically, the invention described herein is directed to power management in response to a power-on signal from a remote source, that is, a "remote power-on" event. "Power management programming" is used herein to mean whatever software or firmware programming is used to implement the method described herein.

FIG. 4 illustrates various internal elements of a single server blade 102. Only those elements relevant to the invention are shown; a server blade may have various other elements associated with its processor, chipset, memory, I/O and other subsystems. More specifically, the hardware associated with server blade 102 may include a processor connected to one or more storage devices, such as a disk drive, through a communication device, such as a bus. The system has memory for storing programs and data during operation. In addition, the server blade may contain one or more communication devices that connect it to a communication network.

The system software of server 102 comprises applications programs, system utilities, a command shell, system services, the operating system, and the system BIOS. "BIOS" is an acronym for basic input/output system, and determines what the server 102 can do without accessing programs from a disk.

In the example of this description, server 102 has an internal PCI bus, a portion of which is identified as bus 407. Names of various signals communicated via the PCI bus are referred to herein by their PCI names. In other embodiments, other bus types and signal names could be substituted.

A Baseboard Management Controller (BMC) 401 monitors the physical health of server 102. It is implemented with a microcontroller that, and uses an Intelligent Platform Management Interface (IPMI) V1.5, which allows standards-based management through IPMI-compliant management tools. Among other tasks, BMC 401 conducts fault monitoring of voltage, fan, and thermal conditions. It uses communications links to ensure notification of system administrators in case of potential problems. It monitors events, and receives and logs event messages in an event log.

An I/O Controller Hub (ICH) 402 controls the blade server's I/O functions. ICH 402 is sometimes referred to as a "southbridge". An example of a suitable ICH is the ICH5, manufactured by Intel Corporation.

A Network Interface Card (NIC) 403 provides network connectivity, such as to an LAN. An example of a suitable NIC 403 is an Ethernet controller such as those manufactured by the Intel Corporation.

Referring to FIGS. 3 and 4, as part of its power management tasks, the BMC 401 communicates with the RAC/MC 205 to decide whether blade server 102 can power on. The communications between BMC 401 and RAC/MC 205 may be achieved by any communications link, but are typically via NIC 403.

Referring also to FIG. 1, when power-on occurs as a result of the user pushing the power button 102a of a blade server 102, the power-on signal is received by BMC 401. Then, BMC 401 sends a chassis control request command to the RAC/MC 205, which checks the power budget of system 100. If there is sufficient power, RAC/MC 205 sends a chassis control request to BMC 401 to power on the server blade 102. BMC 401 issues the power-on command directly to ICH 402 by pulsing a power button line to the ICH 402.

Referring now specifically to FIG. 4, also illustrated are elements of blade server 102 related to other power events. One such event is a "wake on LAN" (WOL) command. This command makes possible to switch on blade server 102 from a remote computer via a LAN, by sending a "magic packet". The WOL signal is routed to NIC 403 and through the PCI bus within blade server 102. Specifically, NIC 403 receives the packet, decodes the packet data, and asserts a PCI PME (Power Management Event) signal on bus 407. The signal is received by a buffer 406.

PME signals 407 can come from other sources in addition to NIC 403. Other such sources include secondary I/O card, referred to as "daughtercard" 404, or PCI baseboard 405. For purposes of this description, these elements are referred to collectively as "PME signal sources". They are each capable of delivering a PME signal to buffer 406.

As indicated above, the invention is not limited to servers having a PCI bus or using PCI signals. Thus, for purposes of this description, PME signals requesting a power-on of the blade server 102 are referred to in a general sense as "power-on signals from a remote source" These power-on signals are in contrast to a "local" power-on signal, such as the power-on signal received by BMC 401 in response to pushing of the power-on button 102a of the blade server 102.

FIG. 5 illustrates a conventional blade server 502. PME signals are routed directly to ICH 402. A power-on automatically occurs when ICH 402 detects the assertion of a PME signal such as WOL. Thus, if NIC 403 asserts a PME WOL signal, blade server 102 could be powered on without the knowledge of BMC 401 or RAC/MC 205. This could result in an attempt to power on the blade server 102 when there is insufficient system power.

Referring again to FIG. 4, to overcome the problem described in the preceding paragraph, in blade server 102, the PME signal is re-routed to BMC 401. In the example of FIG. 4, the PME signal is routed to an event input 401a via a zero ohm resistor 401b. When a PME WOL signal is asserted, BMC 401 sends a power-on request to RAC/MC 205, which checks the power budget of system 100.

If the RAC/MC 205 asserts a power-on, BMC 401 then propagates the PME signal to the PME pin of ICH 402. Otherwise, BMC 401 does not propagate the PME signal to ICH 402, thereby preventing power over budgeting.

The PME signal propagated to the ICH 402 from the BMC may be generally referred to as a "secondary power-on signal" in the sense that it comes indirectly to the ICH rather than directly as in FIG. 5. Whether it is the same power-on signal re-routed, or some form of regenerated power-on signal is not significant to the invention.

To implement the above-described remote power-on management, the relevant firmware programming of BMC 401 is:

EVENT_1=high
EVENT_10=trigger on level change
If (EVENT_10=low & MMB_response=power_on_yes)
EVENT_1=low
else
EVENT_1=high This remote power-on management process is transparent to the BIOS of blade server 102.

Suitable programming of BMC 401 can also be implemented to handle various error conditions. If the user pushes the power button while RAC/MC 205 has already sent a power-on request to BMC 401, then BMC 401 should not send a second power-on request but should wait for the current request to finish. If the user pushes the power button when BMC 401 has already sent a power-on request to the RAC/MC 205, the BMC 401 should not send a second power-on request but should wait for the current request to finish.

Although the disclosed embodiments have been described in detail, it should be understood that various changes, substitutions and alterations can be made to the embodiments without departing from their spirit and scope.

What is claimed is:

1. A method of managing a power-on signal in a clustered server system having a plurality of server modules and a central power management controller, each server module including a baseboard management controller (BMC), the method comprising:
receiving a power-on signal at the BMC of one of the server modules;
the BMC of the server module requesting permission from the central power management controller (MC) to accomplish the power-on;
the BMC of the server module receiving a signal from the MC representing permission to power-on;
routing the power-on signal from the BMC of the server module to an input and output (I/O) control hub (ICH) of the server module; and
using the ICH to power-on the particular server module.

2. The method of claim 1, wherein the server module is a blade server.

3. The method of claim 1, wherein the server module is any high density server module.

4. The method of claim 1, wherein the power-on signal is a wake on LAN (WOL) signal received via a network interface unit of the server module.

5. The method of claim 1, wherein the power-on signal is routed to the BMC at least in part via an internal Peripheral Component Interconnect (PCI) bus.

6. The method of claim 1, wherein the power-on signal is routed to a power-on event input of the BMC.

7. The method of claim 1, wherein the power-on signal is a PME signal of the type associated with a PCI bus.

8. The method of claim 1, wherein the power-on signal is routed from the BMC to a Power Management Event (PME) pin of the ICH.

9. The method of claim 1, wherein the programming step is achieved by programming firmware of the BMC.

10. The method of claim 1, wherein the server module has circuitry for being powered on locally, by a power-on signal directly to the server module.

11. A server module circuit for managing a power-on signal received by a server module from a remote source, where the server module is part of a clustered server system having a central power management controller (MC), comprising:
a network interface card (NIC) for receiving the power-on signal;
a baseboard management controller (BMC), for receiving the power-on signal from the NIC;
an internal bus for carrying the power-on signal, at least in part, to the BMC; and
an I/O control hub for receiving a secondary power-on signal from the BMC and for activating power in response to the secondary power-on signal;
wherein the BMC is programmed to request permission from the MC to accomplish the power-on, and further programmed such that if the MC delivers a signal to the BMC representing permission to power-on, it routes the secondary power-on signal to the ICH.

12. The circuit of claim 11, wherein the server module is a blade server.

13. The circuit of claim 11, wherein the server module is any high density server module.

14. The circuit of claim 11, wherein the power-on signal is a wake on LAN (WOL) signal received via a network interface unit of the server module.

15. The circuit of claim 11, wherein the power-on signal is routed to the BMC at least in part via an internal Peripheral Component Interconnect (PCI) bus.

16. The circuit of claim 11, wherein the power-on signal is routed to a power-on event input of the BMC.

17. The circuit of claim 11, wherein the power-on signal is a PME signal of the type associated with a PCI bus.

18. The circuit of claim 11, wherein the power-on signal is routed from the BMC to a Power Management Event (PME) pin of the ICH.

19. The circuit of claim 11, wherein the programming step is achieved by programming firmware of the BMC.

20. The circuit of claim 11, wherein the server module has circuitry for being powered on locally, by a power-on signal directly to the server module.

21. A high density server module having circuitry for managing a power-on signal received by a server module from a remote source, where the server module is part of a clustered server system having a central power management controller (MC), comprising:
- at least one processor;
- an internal bus;
- memory for program and data storage;
- a network interface card (NIC) for receiving the power-on signal;
- a baseboard management controller (BMC), for receiving the power-on signal from the NIC via the internal bus; and
- an input and output (I/O) control hub for receiving a secondary power-on signal from the BMC and for activating power in response to the secondary power-on signal;
- wherein the BMC is programmed to request permission from the MC to accomplish the power-on, and further programmed such that if the MC delivers a signal to the BMC representing permission to power-on, it routes the secondary power-on signal to the ICH.

22. An improved high density server module having circuitry for managing a power-on signal received by a server module from a remote source, where the server module is part of a clustered server system having a central power management controller (MC), the improvement comprising;
- a network interface card (NIC) for receiving the power-on signal;
- a baseboard management controller (BMC), for receiving the power-on signal from the NIC;
- an internal bus for carrying the power-on signal, at least in part, to the BMC; and
- an input and output (I/O) control hub for receiving a secondary power-on signal from the BMC and for activating power in response to the secondary power-on signal;
- wherein the BMC is programmed to request permission from the MC to accomplish the power-on, and further programmed such that if the MC delivers a signal to the BMC representing permission to power-on, it routes the secondary power-on signal to the ICH.

* * * * *